COUPLING NETWORK FOR SPLIT TRANSDUCERS

Filed Aug. 1, 1956 3 Sheets-Sheet 1

INVENTOR.
WALTER K. VOLKERS

Jan. 17, 1961 W. K. VOLKERS 2,968,717

COUPLING NETWORK FOR SPLIT TRANSDUCERS

Filed Aug. 1, 1956 3 Sheets-Sheet 2

INVENTOR.
WALTER K. VOLKERS

INVENTOR.
WALTER K. VOLKERS

United States Patent Office 2,968,717

Patented Jan. 17, 1961

2,968,717

COUPLING NETWORK FOR SPLIT TRANSDUCERS

Walter K. Volkers, 519 Glen Ave., Scotia, N.Y.

Filed Aug. 1, 1956, Ser. No. 601,560

6 Claims. (Cl. 250—20)

The present invention concerns an improvement of the intelligence-to-noise ratio of a "split transducer," that is, of a transducer which has been split into a number of "strands" or "co-transducers."

In my co-pending patent application Serial No. 601,559, filed August 1, 1956 I have described the reasons why splitting a transducer (which in itself may be a microphone, an antenna, an amplifier, on optical or thermal system, a human observer, or any other intelligence gathering and forwarding, i.e. "transducing," device) into a number of strands, or co-transducers as I prefer to call them here, improves the tranducer's signal-to-noise ratio, or its intelligence-to-noise ratio as I prefer to call it here. For this purpose the co-transducers' output-intelligence-signals and output-poise-signals are combined and thus a "total signal" is developed which has an improved intelligence-to-noise power ratio. The improvement factor thus obtained is essentially equal to the number of co-transducers used if individual transducer gains or transducing efficiencies are identical, also if individual noise-power-signals are equal in magnitude and entirely uncorrelated among themselves.

The present invention improves this system further by providing a non-linear network through which co-transducer output signals are combined to form the total output signal. The purpose of such a non-linear network is to change temporarily the rate of contribution of an individual co-transducer output signal toward the total output signal, if and when such an individual transducer exhibits either a distinct intelligence signal deviation or a noise signal deviation from the average output signal of all transducers. Average, in a broad sense, shall mean here the arithmetical average as well as other forms of average, including the root of the mean of all squares, a logarithmic average, and any other possible forms of statistical average of distinct quantities. The quantities themselves may be any form of distinct quantity that can be observed or recorded, for instance voltage, temperature, light intensity, phase-angle, etc.

One object of my invention is to improve the intelligence-to noise ratio of a split transducer whose co-transducers are subject to individual noise-signal excursions beyond one or more of the boundaries of frequency-non-discriminating random noise, which in the case of electronic amplifier noise voltage may be expressed by the following conditions:

(I) $$\overline{\Delta E_{\mathrm{RMS}}}=\sqrt{\int\frac{e^2dt}{t}}=\text{constant}$$

the integral being taken over a sufficiently long time $t$ during which the average R.M.S. noise voltage $\Delta E_{\mathrm{RMS}}$, developed by the amplifier within a very narrow pass-band can be observed; also (II) $$e=\tfrac{1}{2}E_{\mathrm{PTP}}\cdot\sin(\omega t)$$

specifying an average sinusoidal behavior of the very narrow-band noise voltage observed, $E_{\mathrm{PTP}}$ being the average peak-to-peak voltage of all sine waves, and (III) $$\omega_1<\omega<\omega_2$$

setting lower and upper limits for the noise voltage frequency which is being observed. Such observations are then carried out over the entire frequency range and the constancy of $\Delta E_{\mathrm{RMS}}$ throughout this range according to condition (I) is thus established.

Another object of my invention is the improvement of intelligence-to-noise ratio in split transducers, whose individual co-transducers have different noise levels between themselves while the character of their noise may be either within or outside the boundaries of the three conditions for frequency-non-discriminating noise given above.

Another object of my invention is an improvement of the intelligence-to-noise ratio in split transducers whose individual co-transducers differ between themselves in "noise-phase," their statistical noise-signal excursions being partially or fully correlated if compared with a certain time-delay rather than synchronously.

Another object of my invention is to improve the intelligence-to-noise ratio in split transducers whose individual co-transducers differ between themselves in "signal phase," such difference being essentially a multiple of the reciprocal of the transmission frequency$\times 3\times 10^{10}$ cm./sec.

Another object of my invention is to improve the intelligence-to-noise ratio in split transducers handling pulses or wave trains which are followed by time intervals during which no pulses or wave trains occur, such as radar pulses.

A further object of my invention is to improve the signal-to-noise ratio of a split transducer whose co-transducers are subject to individual intelligence-signal excursions, rather than or in addition to noise-excursions beyond the average intelligence signals received by all transducers. Such signal excursions may concern either amplitude or phase fluctuations or both.

These and other objects of my invention will be best understood by referring to the drawing in which Fig. 1 illustrates the general principle of a non-linear coupling network while Fig. 2 shows a typical non-linear coupling network consisting of semi-conductor diodes.

Fig. 4 shows another diversified radio reception system in which intelligence signals and noise signals are received with definite delays between individual receivers, while

Figure 2:
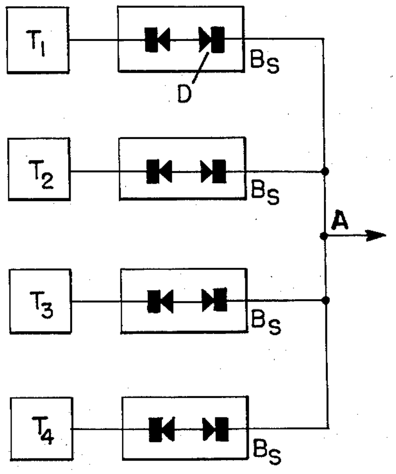
Figures 4, 7:
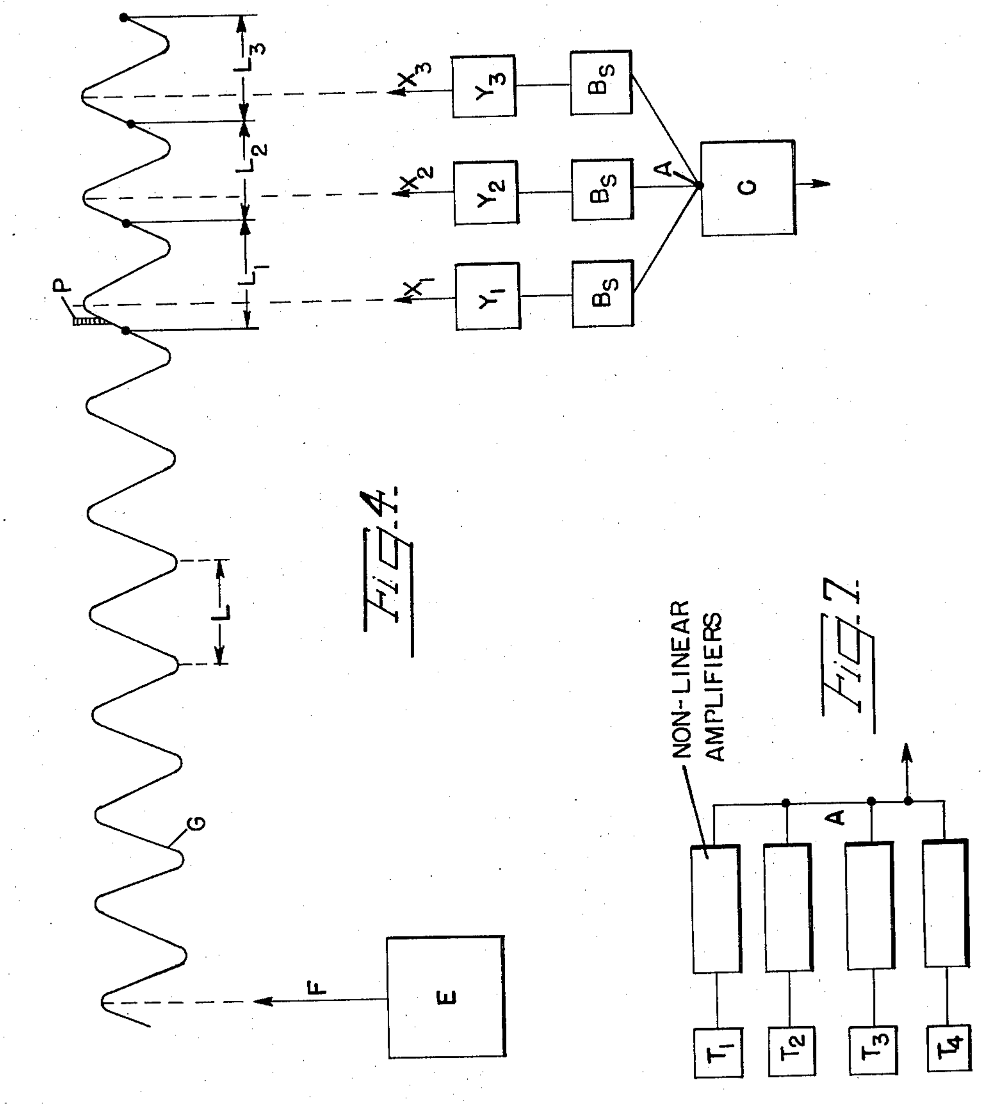
Figure 6:
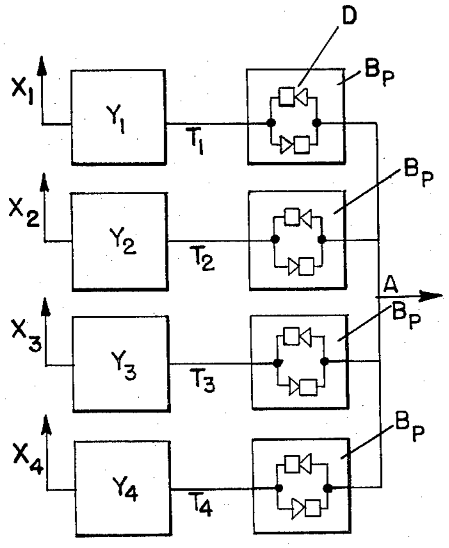

Fig. 6 gives an example of how the non-linear coupling action in Fig. 2 can be reversed, and Fig. 7 describes the use of non-linear amplification as a means to obtain non-linear coupling between co-transducer outputs.

Figure 1:
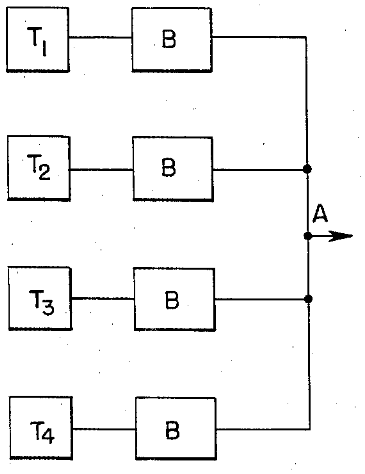

In Fig. 1 there are shown four electrical transducers $T_1$, $T_2$, $T_3$, and $T_4$ which feed their output signals into a common bus bar A in order to form the "total signal" referred to above. Between each transducer and bus bar A is a non-linear coupling element B. This coupling element can be non-linear in various manners. For instance it can be an essentially ohmic resistance which increases or decreases with signal current or voltage, thus automatically changing its resistance and thereby increasing or decreasing the effective signal-contribution of the individual co-transducer to which it is attached towards the total signal in bus bar A. It can also be a non-ohmic or partially ohmic frequency or phase discriminating device which causes individual transducers to exert either an excessive influence or a reduced influence upon the formation of the total signal.

Another example of non-linear coupling in a split transducer is the optical field where non-linear optical coupling or intelligence transducing elements, such as non-linear light filters, non-linear photographic reproductions, or non-linear video amplifiers may be used to create the desired effect.

In these examples and many other fields of application, non-linear couplers, non-linear connecting links, non-linear intelligence forwarding devices, or non-linear processes can be arranged between each co-transducer and the point at which the total intelligence signal is developed.

Fig. 2 shows a simple electrical example of this principle in which the non-linear coupling elements $B_S$ consist of two semi-conductor diodes D in back-to-back series connection, in other words typical crystal diode current limiters which automatically increase their series-resistance as current passing through them in either direction increases.

Let us assume that the four transducers $T_1$–$T_4$ are receiving essentially identical intelligence signals and that at a given moment $t_1$. Transducers $T_1$ receives or develops an additional random or noise signal. This noise signal, if large enough, will represent a major deviation of the combined intelligence and noise signal in $T_1$ from the equivalent total signal in bus bar A. A voltage drop will therefore be created across its coupling element $B_S$. If $B_S$ were a linear resistor the signal in A would follow the individual signal excursion in $T_1$ on a proportional basis, i.e. by a ratio of 1/4 since four transducers are used. However since $B_S$ is a non-linear resistor, which increases its resistance with the current passing through it, or the voltage drop across it, the resulting change of the total signal in A due to the noise-excursion of the signal in $T_1$ will be less than 1/4 of the excursion in $T_1$. To what extent it will be less depends upon the actual voltage/current characteristic of the type of diode used as well as the signal excursion voltage level or current level which pertains. At any rate, a definite intelligence-to-noise ratio improvement will become apparent by using non-linear coupling elements instead of simple linear coupling elements, for instance resistor, as described in my co-pending patent application Serial No. 601,559, filed August 1, 1956.

The obtainable intelligence-to-noise ratio improvement of the system, by changing linear combination of the co-transducer output signals into non-linear combination, also depends to a large extent upon the nature of noise itself. The following conclusions can be drawn in this respect:

(*a*) The possible intelligence-to-noise ratio improvement by replacing linear co-transducer coupling elements with non-linear elements, such as those in Fig. 2, depends to a considerable extent upon the statistical spectrum of the noise signals. The greater the statistical difference in noise signals in the various co-transducers is, over a given period of time, the more effective will be the noise-reduction in the total signal by changing from linear to non-linear coupling elements.

(*b*) The more statistically inherently different the individual noise signals in transducers are, the greater will be the improvement of intelligence-to-noise ratio through replacement of linear coupling elements by non-linear elements.

(*c*) A relatively small improvement will therefore manifest itself if we are dealing with long-term "white noise," and if the average R.M.S. noise signals in individual co-transducers over a comparatively long period of time are nearly identical. More substantial improvements will occur if the period of observation is relatively short because in this case, even if the noise sources within or linked with each co-transducer are essentially identical, random deviations of noise will, in a comparatively short period of time, cause the average R.M.S. noise signals of individual co-transducers in this short time to deviate more among themselves both in magnitude and in statistical distribution.

(*d*) If noise is not "white" in nature, that is if the same narrow frequency band is not represented at each center-frequency throughout the entire wide band by the same amplitude over a long time interval, the improvement of intelligence-to-noise ratio through replacement of linear coupling elements by non-linear coupling elements will be more pronounced.

(*e*) This is true, regardless of whether the period of observation is short or long.

(*f*) If average R.M.S. noise signals in individual co-transducers deviate substantially over a long period of time, in other words if individual co-transducers are more noisy or are receiving larger noise signals than others, the improvement of intelligence-to-noise ratio will be substantial, regardless of the length of the period of time and regardless of whether noise is "white" or not, if linear coupling elements are replaced by non-linear coupling elements and if these elements are sufficiently non-linear.

Experiments with electronic amplifiers have fully confirmed the foregoing conclusions.

The philosophical meaning underlying the principle of a non-linear coupling network of the type shown in Fig. 2, that is of a network having flexible coupling links which tend to oppose the deviation of an individual signal contribution from the other contributors, can best be expressed as Minority Disqualification. In other words a noise separator, using non-linear coupling links, can be compared to a group of people in a business or political relationship who reach decisions by disqualifying the opinions or votes of dissenting minority groups. Since the disqualification concerns noise, not intelligence, there is a definite improvement of intelligence transmission (or evaluation). If the disqualification were to concern intelligence signals, the opposite would be the case. A practical political example of such Minority Disqualification is presidential nominations in which it is customary for minority groups to withdraw their condidate toward the end of balloting, usually for the purpose of casting their final votes in favor of the majority candidate.

The political analogy might give rise to the question of how intelligence and noise can logically be separated if individuals express different opinions. If intelligence concerns creative activities, a clear-cut answer may be hard to find; but if it concerns reactions to existing conditions, an activity typical of a merely administrative body, such administrative activities can be likened to a "transducer," in other words a device, or body of people, which receives information and passes it on after having carried out some form of transduction (intelligence conversion).

Figure 3:
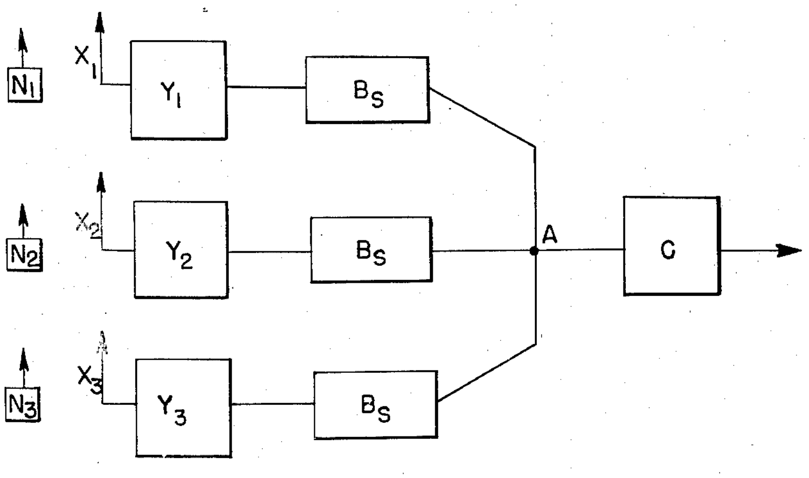
Fig. 3 shows a diversified radio reception system incorporating a non-linear coupling network which improves the average intelligence-to-noise ratio.

Fig. 3 shows a practical application of non-linear network co-transducer signal combination applying to long distance ratio reception. $X_1$, $X_2$, and $X_3$ are three antennae, $Y_1$, $Y_2$, and $Y_3$ their receivers, and $B_S$ non-linear coupling elements similar to the ones described in Fig. 2. Their output signals are combined in bus bar A and then further amplified in amplifier C which may be an RF, IF, or audio amplifier. $N_1$, $N_2$, and $N_3$ are local noise radiators, each being located near one particular antenna. They may be sources of atmospheric static, electric power line interference, or jamming transmitters planted by enemies.

My co-pending patent application Serial No. 601,559, filed August 1, 1956 shows how the effect of such interference signals can be reduced by using more than a single receiver and by combining the output signals of these receivers. The non-linear coupling elements $B_S$ which have been added to such a system in Fig. 3 greatly increase its effectiveness because each individual noise signal or noise pulse automatically "disqualifies" itself through the non-linear coupling element in the receiver nearest to its location of origin.

In Fig. 4 this principle is further elaborated. E is a transmitter and F its broadcasting antenna. G is a wave train transmitted by the broadcasting antenna in the direction of three receiving antennae $X_1$, $X_2$, and $X_3$. These are spaced at intervals which are multiples of the wave length L. Here they are shown as being spaced one wave length apart, although in some cases this may be found to be impractical; a multiple of the wave lengths, such as 2, 3, 5 etc., may sometimes be preferred. As the wave train G passes antennae $X_1$, $X_2$, and $X_3$, a certain interference signal, shown here as a rectangular pulse P, is assumed to be imposed upon a particular wave $L_1$, which happens to be passing antenna $X_1$. The other two antennae $X_2$ and $X_3$ are not picking up this pulse since the preceding waves $L_2$ and $L_3$, which they are receiving, are not distorted by it. Each antenna is again connected to a receiver $Y_1$, $Y_2$, etc. which in turn feeds its output signal into a common output transducer C through non-linear coupling elements $B_S$.

While passing the first antenna $X_1$, pulse P will reproduce itself partially in A, its reduced relative power being substantially less than 1/3 of what it would be if one, instead of three, receivers were used and if linear instead of non-linear mixing were employed.

Following the travel of wave $L_1$ and its noise pulse P as it reaches the next receiving antenna $X_2$, we have repetition of the same condition. This time the non-linear coupling element $B_S$ of receiver $Y_2$ will "disqualify" noise pulse P in the same manner in which the first non-linear coupling element rejected it when it was picked up by antenna $X_1$, because neither of the other two antennae, $X_1$ nor $X_3$, is now picking up this noise pulse but are both receiving undistorted waves. The same is true again of antenna $X_3$ and its non-linear coupling element $B_S$ when wave $L_1$ and pulse P are picked up by it and amplified in receiver $Y_3$.

We therefore have a non-linear receiving system which vigorously rejects interfering signals that pass through it. It actually converts large noise pulses into a number of smaller pulses, this number being identical at times to the number of co-transducers used. It goes without saying that the system will react in a similar manner to any combination of pulses or other interference sources. As a matter of fact, its principle is based on a comparison of subsequent waves, and it eliminates in the total signal a large percentage of the individual interference signals received.

The multiple antenna and non-linear coupling system shown in Fig. 4 is mainly useful for the rejection of static or jamming signals which reach the three antennae shown from essentially the same direction from which the transmitted signal originated. However it will also be effective against interference signals which reach the three antennae from any other direction, or against signals that may originate in the immediate vicinity of a particular antenna and are so weak that only this particular antenna is capable of picking them up (see Fig. 3).

A particularly important application of this system concerns radar receivers. Radar is often an omni-directional device. In other instances it covers fairly wide angles in one or more planes. The simple physical relationship between arriving wave trains and antennae locations assumed in Fig. 4 does not apply for radar unless the angles scanned by the radar antenna are sufficiently narrow. If they are not narrow, a mechanical driving system similar to the one in Fig. 5 can be used. This automatically shifts the locations *a*, *b*, and *c* of the radar antennae pivots *d*, *e*, and *f* by means of second pivots *g*, *h*, and *i* or other suitable driving mechanisms such as cams and cam shafts, excentric gears, etc. in such manner that the three antennae $X_1$, $X_2$, and $X_3$ always receive signals of subsequent waves in phase or nearly in phase, though with delays equivalent to multiples of the wave length.

Figure 5:
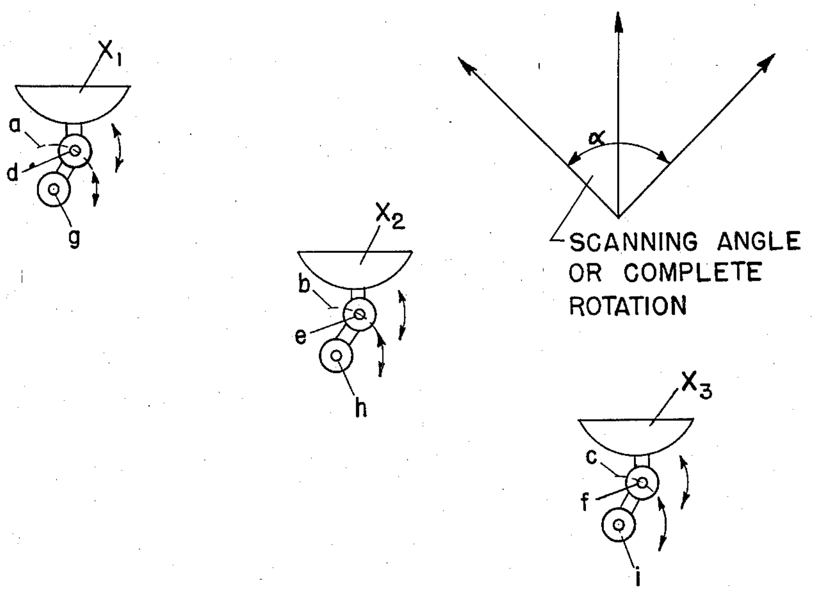
Fig. 5 illustrates a similar radar system in which accurate delays are enforced by mechanical means.

Since radar operates on the principle of the transmission and reception of interrupted wave trains, commonly referred to as radar pulses, an antenna arrangement such as shown in Fig. 5 in conjunction with linear or non-linear coupling elements (not shown in Fig. 5) will cause a loss of waves, or at least a partial reduction of wave amplitudes, in the beginning and at the end of each wave-train pulse. For instance if three antennae are used, as illustrated in Fig. 5, the first wave will be received by antenna $X_1$ only. Since antennae $X_2$ and $X_3$ have not yet received a corresponding wave, they are in the majority and would disqualify or substantially reduce the signal received by antenna $X_1$. One wave later two antennae, $X_1$ and $X_2$ are receiving signals while antenna $X_3$ is not yet receiving the signal. Now antennae $X_1$ and $X_2$ are in the majority and disqualify $X_3$ and its receiver. Therefore the signals received by $X_1$ and $X_2$ will appear in the total signal in nearly full magnitude. Again a wave later, all three antennae will receive synchronous signal waves, no disqualification taking place, and this status will continue until the end of the wave-train. Then antenna $X_1$ being the foremost one, does not receive a wave but antennae $X_2$ and $X_3$ still carry the signal, partially or completely disqualifying the no-signal report of $X_1$ until, again a wave later, both antennae $X_1$ and $X_2$ are silent, disqualifying or nearly disqualifying the signal report of antenna $X_3$.

In the case of the diversified radar system just described, the maximum permissible number of antennae and the limit of possible intelligence-to-noise ratio improvement is therefore set by the number of waves in each pulse which may be permitted to "deteriorate" by Minority Disqualification.

An interesting modification of the principle of the split transducer with non-linear coupling elements is the direct reversal of the action of the non-linear coupling elements, such as those shown in Fig. 2, as well as any physical equivalents of this reversal inside and outside the field of electronics.

Fig. 6 shows how the non-linear crystal diode coupler of Fig. 2 can be reversed. Again four transducers $T_1$, $T_2$, $T_3$, and $T_4$ are shown, each feeding its output signal into a non-linear coupling element Bp. Here, however, the two crystals are not series-connected but are parallel-connected, their polarities again being opposite. A coupling element of this type is a Majority Disqualifier, because the coupling resistance of the crystals decreases with increasing signal, enforcing a larger signal contribution of an individual co-transducer with reference to bus bar A if the signal, whether intelligence or noise signal, in the particular co-transducer is larger than in the other transducer.

A system of this kind is of particular value in cases where transducers are sometimes temporarily disabled or deliver distorted signals.

A good example would again be a diversified radio receiving system such as the one in Fig. 6 in which the four transducers $T_1$, $T_2$, $T_3$, and $T_4$ are separate antennae $X_1$, $X_2$, etc. or, as in this case, separate antennae with individual receivers $Y_1$, $Y_2$, etc. attached to them. If under difficult receiving conditions the majority of receivers is temporarily disabled, the minority, or even a single antenna can "carry" the signal. It would do this in a much more efficient manner than if pure linear mixing is carried out in the customary manner. The "disablement" may concern amplitude as well as phase or frequency shifts.

If one of the four co-transducers shown becomes temporarily disabled due to to fading it will not "drag" heavily on bus bar A as, for instance, a disabled airplane engine drags on the other three engines of a four-motored plane. Instead, the non-linear coupling element $B_p$ of the temporarily disabled transducer "feathers" the transducer in the same manner that an airplane pilot feathers the propeller blades of his disabled engine, decreasing the "drag" on the other engines.

The principle of non-linear coupling and Minority Disqualification can be applied to any form of electronic, electrical, mechanical acoustical, optical, thermal, or chemical transducers as well as evaluation of tangible or abstract intelligence reports in general. Examples of these various devices have been described in my co-pending patent application Serial No. 601,559, filed August 1, 1956 and need not be repeated here. It is also obvious that the non-linear coupling elements can be inserted anywhere within the transducing system, either before or after amplification, or magnification in general.

It is also obvious that in electronic amplifiers the physical shape of the non-linear coupling elements need not be restricted to crystal diodes such as those in Figs. 2 and 6. In electronic amplifiers non-linear coupling may also be obtained by simple tube, transistor, or amplifier non-linearity which may be inherent or obtained through biasing. Fig. 7 shows such a non-linear amplifier.

There are also available a number of non-linear resistance materials, the oldest being thyrite, which possess the desired non-linearity of signal transmission.

Equivalent non-linear coupling or signal feeding devices are available in other fields, for instance non-linearity in photographic reproduction or non-linear video amplifiers for optical systems.

What I claim as new and wish to protect is:

1. In a diversity transducer system having a plurality of co-transducers for receiving the same signal wave, a common signal output point, means including an instantaneously acting non-linear continuous function output device coupled between each of said co-transducers and said output point for decreasing individual co-transducer signal contributions with increasing deviation of the contribution of said individual co-transducers towards said common signal point.

2. The system of claim 1 wherein each of said non-linear output devices comprises a plurality of semiconductor diodes, the diodes of each device being connected for transmitting said individual signal contributions non-linearly with respect to magnitude.

3. The system of claim 1 wherein each of said non-linear devices comprises a series connected pair of semiconductor diodes, the diodes of each network being connected between themselves with opposite polarity.

4. In a diversity transducing system having a plurality of co-transducers for receiving the same signal wave, an antenna associated with each of said co-transducers, said antennae being spaced substantially at multiples of the wave length of the transmission frequency for receiving the same signal wave, means including an instantaneously acting non-linear continuous function output device coupled between each of said co-transducers and a common signal output point for decreasing individual co-transducer signal contributions with increasing deviation of the contribution of said individual co-transducers towards said common signal point.

5. The system of claim 4 further comprising means for rotating said antennae about pivots and means for moving said pivots in synchronism with the antennae rotation for continuously correcting the positions of said antennae so that they are continuously substantially spaced at said multiples of said wavelength of the transmission signals.

6. In a diversity transducing system having a plurality of co-transducers for receiving the same signal wave, antenna associated with each of said co-transducers, said antennae being spaced substantially at multiples of the wave length of the transmission frequency for receiving the same signal wave, means including an instantaneously acting non-linear continuous function output device coupled between each of said co-transducers and a common signal output point for reducing the individual contribution of an individual co-transducer towards said common signal point as the phase angle of the signal received varies from the average phase angle of all signals received by said plurality of co-transducers.

References Cited in the file of this patent

UNITED STATES PATENTS

| | | |
|---|---|---|
| 1,747,236 | Gillett | Feb. 18, 1930 |
| 1,876,159 | Young | Sept. 6, 1932 |
| 1,883,613 | Devol | Oct. 18, 1932 |
| 2,122,748 | Mayer | July 5, 1938 |
| 2,255,374 | Beverage | Sept. 9, 1941 |
| 2,358,448 | Earp | Sept. 19, 1944 |
| 2,455,654 | Browne | Dec. 7, 1948 |
| 2,551,805 | McDonald | May 8, 1951 |
| 2,634,398 | Piety | Apr. 7, 1953 |
| 2,638,402 | Lee | May 12, 1953 |
| 2,662,126 | Henson | Dec. 8, 1953 |
| 2,679,585 | Drazy | May 25, 1954 |
| 2,691,889 | Dion et al. | Oct. 19, 1954 |
| 2,720,583 | Crosby | Oct. 11, 1955 |
| 2,803,703 | Sherwin | Aug. 20, 1957 |

FOREIGN PATENTS

| | | |
|---|---|---|
| 653,574 | Germany | Nov. 27, 1937 |
| 727,279 | Germany | Oct. 30, 1942 |

OTHER REFERENCES

Article: "Audio Noise Reduction Circuits" by Olson, pages 118–122 of "Electronics" for December 1947.